Jan. 13, 1953 J. L. ATWOOD 2,625,284
BAKERY GOODS REMOVING MACHINE
Filed April 24, 1950 3 Sheets-Sheet 1

James L. Atwood
INVENTOR.

BY
Attorneys

Jan. 13, 1953 J. L. ATWOOD 2,625,284
BAKERY GOODS REMOVING MACHINE
Filed April 24, 1950 3 Sheets-Sheet 2
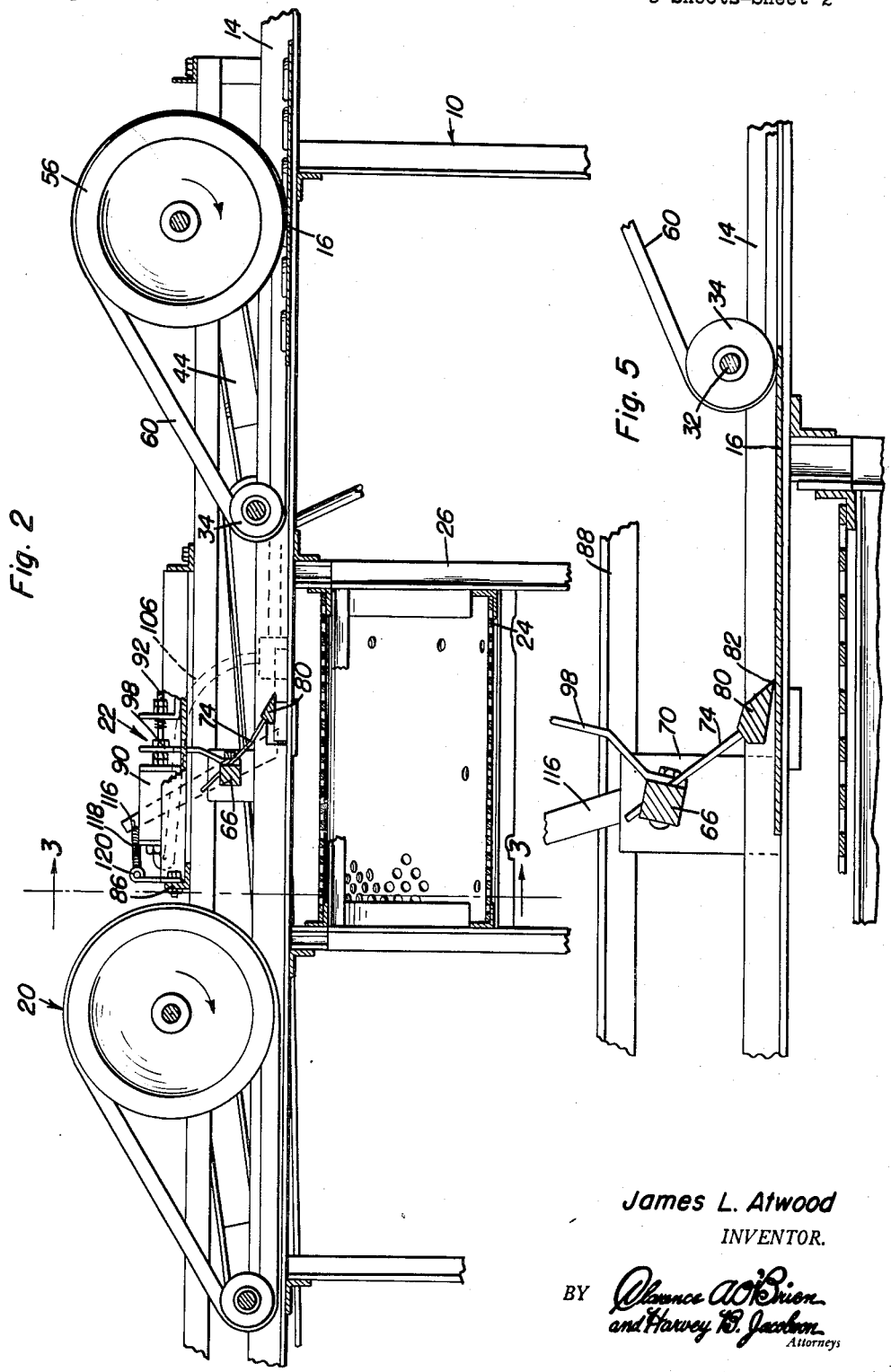
James L. Atwood
INVENTOR.

Jan. 13, 1953 J. L. ATWOOD 2,625,284
BAKERY GOODS REMOVING MACHINE
Filed April 24, 1950 3 Sheets-Sheet 3
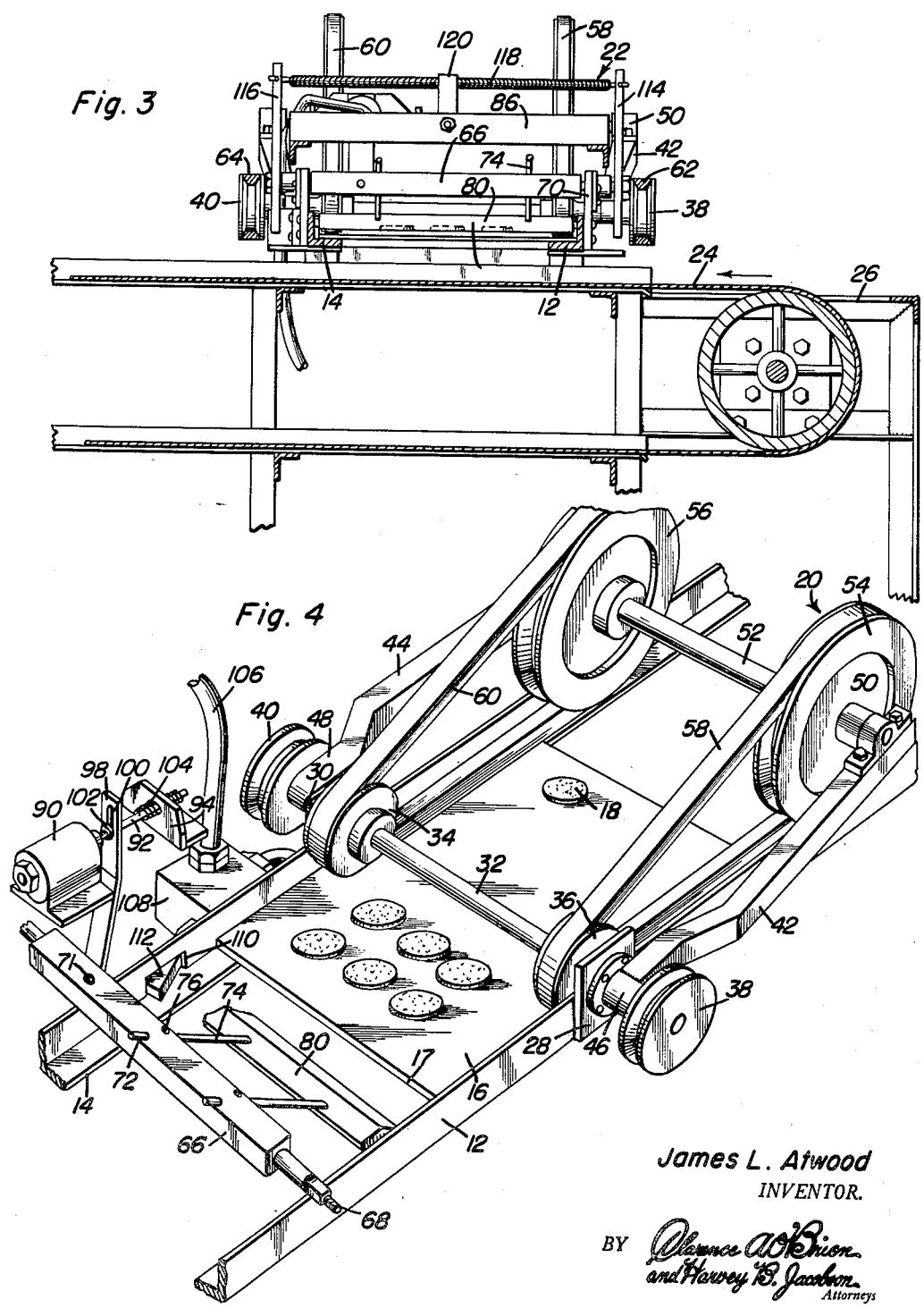
James L. Atwood
INVENTOR.
BY Clarence A. O'Brien
and Harvey B. Jacobson
Attorneys Patented Jan. 13, 1953

2,625,284

UNITED STATES PATENT OFFICE 2,625,284

BAKERY GOODS REMOVING MACHINE

James L. Atwood, Nashville, Tenn.

Application April 24, 1950, Serial No. 157,819

9 Claims. (Cl. 214—310)

This invention appertains to means for scraping or discharging cookies or like articles from sheets or pans on which the cookies are baked. This invention is particularly designed for use in an automatic baking system, wherein the cookies are baked on loose pans or sheets, which are carried by endless conveyors through a tunnel oven.

The primary object of the instant invention is to automatically discharge or scrape cookies from loose pans or sheets, which are carried by conveyors, the cookies being discharged onto an endless conveyor by means of which they are carried to a packaging machine.

In accordance with the present invention, loose pans are moved on a frame by conveying means and a scraper is automatically lowered into engagement with the upper faces of the pan to disengage the cookies therefrom, as the pans move therebeneath, the scraper being actuated in response to the forward movement of the sheets or pans.

Another important object of this invention is to provide a dependable and extremely efficient scraping mechanism, which is inexpensively constructed and operated and which is completely automatic in operation, thus requiring no attention or manual assistance.

A meritorious feature of this invention resides in the provision of switch means for operating a hydraulic means for lowering and retaining a scraper or knife in engagement with the upper faces of the pan, the switch means being positioned in the path of movement of the pans and being actuated by the front edges of the pans.

Another important feature of this invention lies in the provision of a pair of parallel tracks, on which the opposing side edges of the pans are slidably mounted, together with vertically disposed conveying means, which engage on the side edges of the pans and thereby move the pans forwardly along the tracks, and at the same time preventing vertical displacement of the pans.

Another meritorious feature of this invention resides in the provision of a support or rod rotatably journaled on the frame and positioned transversely to the path of movement of the pans, the rod carrying a parallel scraper, which is secured thereto by resilient fingers.

In general, this invention consists of a scraper or cookie discharging machine, which includes a pair of parallel tracks on which the pans or sheets are mounted for movement, with a scraper extending transversely across the path of movement of the pan. Hydraulic means is provided for lowering the scraper into engagement with the upper faces of the pans and, at the same time, avoiding the front or leading edge of each advancing pan. A switch controls the hydraulic means and is actuated by the leading edge of each advancing pan, so that the scraper is lowered into engagement with the pan as the pan passes there beneath. Resilient means is provided for raising the scraper after it passes over one pan until the next pan actuates the switch means.

The above and ancillary objects and further structural features of merit are attained by this invention, the preferred embodiment of which is set forth in the following description and illustrated in the accompanying drawings, wherein:

Figure 2 is a longitudinal vertical sectional view taken on line 2—2 of Figure 1;

Figure 3 is a transverse sectional view taken on line 3—3 of Figure 2;

Figure 4 is a view in perspective of the scraper and conveying means; and

Figure 5 is a fragmentary sectional view, illustrating the scraper in operation and in contact with the upper face of one of the pans or sheets.

Figure 1:
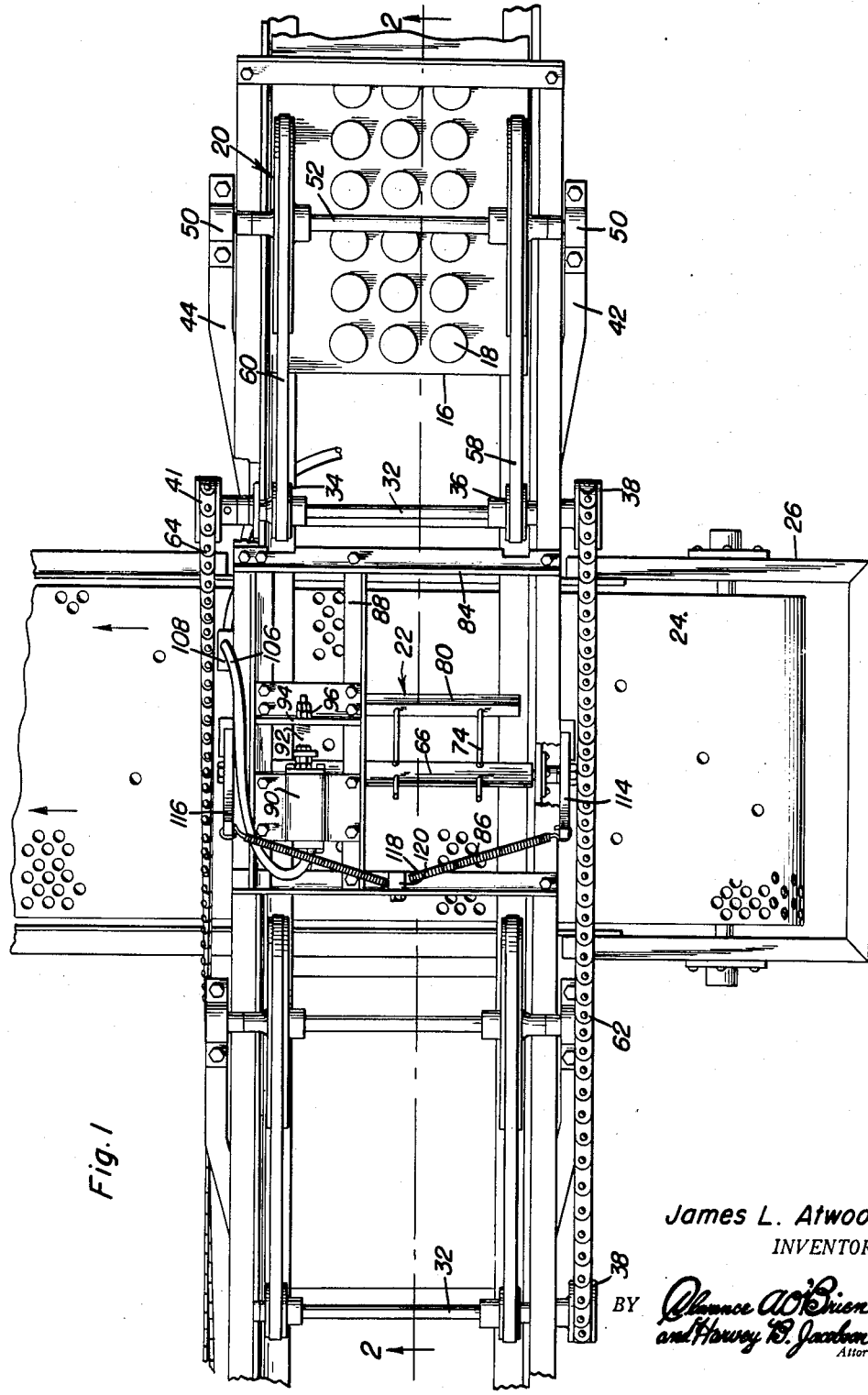
Figure 1 is a top plan view.

The preferred embodiment of this invention, as seen in the accompanying drawings, consists of a frame 10 on which a pair of longitudinally extending parallel angle irons 12 and 14 are mounted, the angle irons forming transversely spaced parallel tracks arranged for the reception of cookie sheets or pans 16 of the smooth type. The pans 16 are moved by conveyors through tunnel ovens until the cookies 18 are baked. The pans are then moved by conveying means 20 along the tracks 12 and 14 beneath a scraping or discharging means 22, which scrapes the cookies from the upper faces of the pans and discharges them downwardly between the tracks onto a conveyor belt 24. The conveyor belt 24 is rotatably mounted on a frame 26, which is disposed transversely to the tracks and the conveyor belt passes beneath the scraping means to receive the cookies, scraped off the pans 16. The conveyor belt 24 conveys the cookies to a suitable wrapping and packaging mechanism.

The conveying means 20 is positioned in advance and rearwardly of the scraping mechanism and functions not only to move the pans on the tracks, but also to prevent vertical displacement thereof by holding the pans onto the tracks. For mounting the conveying means, a pair of ears 28 and 30 are welded or otherwise secured to the tracks and project upwardly therefrom. The ears are suitably apertured in transverse alignment to receive a shaft 32. The shaft is mounted transversely above the pans, which move therebeneath. Pulleys 34 and 36 are secured on the shaft within the tracks and pulleys 38 and 40 are secured on the extending opposed terminals of the shaft. Supporting arms 42 and 44 are formed at one end with offset bearing sleeves 46 and 48 journaled on the shafts between the ears and the end pulleys 38 and 40. Bearing blocks 50 are fixed on the upper faces of the arms, at their opposite ends, to support the opposing terminals of a shaft 52 on which pulley wheels 54 and 56 are secured. Belts 58 and 60 are entrained over the longitudinally aligned pulleys, the belt 58 connecting the pulleys 36 and 54 and the belt 60 connecting the pulleys 34 and 56. The belts engage the opposing side edges of the pans to move the pans forwardly on the tracks, as seen in Figure 4. The shaft 52 and its attendant pulleys 54 and 56 initially engage and meet the lead edge of the pans and the pulley wheels move upwardly to permit the pans to move thereunder, the pulley wheels moving about the shaft 32.

The conveyor positioned rearwardly of the scraping mechanism, as seen in Figure 1, is constructed and functions similarly to the conveyor illustrated in detail in Figure 4 and above described, except that the conveyor positioned rearwardly of the scraping mechanism is provided on its shaft 32 with only the pulley 38, so that the two pulleys are connected by a chain drive 62. The pulley 41 is provided to receive a drive chain 64 which is suitably powered.

The scraper mechanism 22 includes a square support shaft or rod 66, which is provided with reduced ends 68, the ends being rotatably journaled in vertical plates 70 carried by the tracks. The shaft 66 is provided with angular openings 71 to receive the upper ends 72 of spring fingers or rods 74. The rods or fingers are adjustably secured within the openings by means of set screws 76. The spring fingers extend laterally from the shaft and support a scraper or blade 80 at their lower ends. The blade is formed with a scraping or cutting edge 82, shown in operation in Figure 5.

A pair of angle irons 84 and 86 are carried by and transversely overlie the tracks, the angle irons being disposed in advance of and rearwardly of the support shaft 66. A rectangular frame 88 is supported by the angle irons and a small air cylinder 90 is mounted on the frame. A piston rod 92 is workably disposed in the cylinder and the outer end of the rod being projects therefrom, the outer end of the rod being secured through an angle iron stop 94 and being exteriorly threaded to receive stop nuts 96. An arm 98 is secured at its lower end to the shaft 66 and the upper end is formed with an axial slot 100, through which the piston rod passes. A stop 102 is secured on the piston rod and abuts against the arm 98 to rotate the shaft 66, a spring 104 being concentrically disposed about the piston rod and abutting against the angle iron stop 94 and serving as a shock absorber for the arm 98.

An air hose or conduit 106 is connected to the cylinder and passes through a switch box 108. An opening 110 is formed in the vertical flange of the angle iron track 14 and a cam faced switch contact 112 extends through the opening and is positioned within the path of the pan 16, as seen in Figure 4. With respect to Figure 4, it is to be noted that the lead edge 17 of the pan 16 will abut against the outer cam face of the switch contact and will urge the same outwardly and hold it in that position, until the pan travels past the switch, at which time spring means associated with the movable contact will urge it inwardly into the position illustrated.

At that time, means is provided and is connected to the shaft 66 for raising the scraper or cutter 80 upwardly until the next pan contacts the switch. In this respect, bars or arms 114 and 116 extend upwardly from the opposing ends of the shaft 66 and the opposing terminals of a coil spring 118 are anchored to the upper ends of the arms. A hook 120 is carried by the angle iron 86 and anchors the central portion of the spring thereto. Thus, as the shaft is rotated to move the scraper downwardly into engagement with the upper face of a pan, upon actuation of the switch, the spring is distended and, upon release of the switch by the pan, the spring urges the arms 114 and 116 rearwardly to rotate the shaft 66 and raise the scraper.

Thus, it can be seen that a very simple and economical scraping mechanism has been provided which will be completely automatic in operation and which will reduce the time normally expended for scraping cookies to a minimum.

Having described the invention, what is claimed as new is:

1. A cookie scraping machine comprising a frame, means for conveying pans of cookies on the frame, a scraper carried by the frame transversely to the path of movement of the pans, hydraulic means for pressing said scraper into engagement with the upper faces of said pans for scraping the cookies therefrom as the pans are moved beneath the scraper, and switch means interposed in the path of movement of the pans and actuated by contact therewith for operating said hydraulic means, said conveying means overlying and holding said pans on the frame against vertical displacement while moving them along the frame.

2. A cookie scraping machine comprising a frame, means for conveying pans of cookies on the frame, a support rotatably journaled on the frame and disposed transversely of and above the pans moving on the frame, a scraper carried by the support and disposed parallel therewith, a hydraulic cylinder on said frame, a piston rod working in said cylinder and connected to the support for rotating the same to press the scraper into engagement with the upper faces of the pans, switch means positioned in the path of movement of the pans and actuated by contact therewith for operating said piston rod and means operatively connected to the support for raising the scraper after it passes over one pan until the next pan actuates the switch means, said last means including a pair of lateral arms on the terminals of the support, a bar fixedly mounted on the frame parallel with and behind the support, a coil spring having its ends anchored to the arms and means for securing the spring centrally to the bar.

3. A cookie scraping machine comprising a frame, means for conveying pans of cookies on the frame, a support rotatably journaled on the frame and disposed transversely of and above the pans moving on the frame, a scraper carried by the support and disposed parallel therewith, a hydraulic cylinder on said frame, a piston rod working in said cylinder and connected to the support for rotating the same to press the scraper into engagement with the upper faces of the pans, switch means positioned in the path of movement of the pans and actuated by contact therewith for operating said piston rod and means operatively connected to the support for raising the scraper after it passes over one pan until the next pan actuates the switch means comprising a bar extending upwardly from the support at one end thereof and having an upper terminal receiving the extending portion of the piston rod and means for securing the piston rod thereto.

4. In combination with conveying means mounted for rotary movement on an open frame, means for scraping cookies off pans moved along the frame by the conveying means and including a rod rotatably journaled on the frame transversely of the conveying means, spring fingers laterally projecting from the rod, a scraper secured to the outer ends of the fingers, an air cylinder mounted on the frame, a bar laterally extending from the rod, a piston working in said cylinder and connected to the bar, a switch positioned in the path of movement of the pans and operated thereby for communicating the cylinder with a source of air under pressure whereby the rod is rotated to press the scraper onto the upper face of a pan passing therebeneath, a pair of arms carried by the rod, a spring having its ends anchored to the arms, a fixed bar secured to the frame parallel with and behind the rod, and means for securing the spring to the fixed bar so that the scraper is raised after it passes over one pan until the successive pan actuates the switch means.

5. In combination with conveying means mounted for rotary movement on an open frame, means for scraping cookies off pans moved along the frame by the conveying means and including a rod rotatably journaled on the frame transversely of the conveying means, spring fingers laterally projecting from the rod, a scraper secured to the outer ends of the fingers, an air cylinder mounted on the frame, a bar laterally extending from the rod, a piston working in said cylinder and connected to the bar, a switch positioned in the path of movement of the pans and operated thereby for communicating the cylinder with a source of air under pressure whereby the rod is rotated to press the scraper onto the upper face of a pan passing therebeneath, a pair of arms carried by the rod, a spring having its ends anchored to the arms, a fixed bar secured to the frame parallel with and behind the rod, and means for securing the spring to the fixed bar so that the scraper is raised after it passes over one pan until the successive pan actuates the switch means, said frame including a pair of parallel tracks supporting the opposing side edges of the pans and one of said tracks having an opening for receiving the switch means which includes a cam faced trigger engaged by the front edge of the pans.

6. A cookie scraping machine comprising a frame, means for conveying pans of cookies on the frame, a scraper carried by the frame transversely to the path of movement of the pans, hydraulic means for pressing said scraper into engagement with the upper faces of said pans for scraping the cookies therefrom as the pans are moved beneath the scraper, and switch means interposed in the path of movement of the pans and actuated by contact therewith for operating said hydraulic means, said frame including a pair of parallel tracks supporting the opposing side edges of the pans and one of said tracks having an opening for receiving the switch means which includes a cam faced trigger engaged by the front edge of the pans.

7. In combination, a pair of laterally spaced horizontal tracks for supporting the opposite side edges of baking pans, a cross conveyor beneath said tracks, a pair of endless belt conveyors above said tracks and at one side of the cross conveyor connected in laterally spaced opposite relation for frictionally engaging the tops of said pans at opposite side edges thereof to convey said pans along said tracks and over said cross conveyor, a second pair of endless belt conveyors above said tracks and at the other side of the cross conveyor connected together in laterally spaced opposite relation for frictionally engaging the tops of the pans at said side edges to convey said pans away from the cross conveyor, pan scraping means mounted on said tracks intermediate said pairs of conveyors for controlled operation to scrape material off the tops of the pans to fall upon the cross conveyor as said pans pass over said conveyor, and means to control said pan scraping means operative by said pans as said pans pass over said cross conveyor.

8. The combination according to claim 7 wherein said first named means comprises a rocker rod extending across said tracks and carrying a scraper, a lever on said rod for rocking the same, and a pressure operated piston operating said lever.

9. The combination according to claim 7 wherein said last means comprises a cam member operative in one track by the leading edge of each pan.

JAMES L. ATWOOD.

REFERENCES CITED

The following references are of record in the file of this patent:

UNITED STATES PATENTS

| Number | Name | Date |
|---|---|---|
| 874,195 | Herbert, Jr. | Dec. 17, 1907 |
| 1,279,563 | Lowell | Sept. 24, 1918 |
| 1,351,018 | Blando | Aug. 31, 1920 |
| 1,677,179 | Gopel | July 17, 1928 |
| 1,937,303 | Worrall | Nov. 28, 1933 |
| 1,944,103 | Naylor | Jan. 16, 1934 |
| 2,063,230 | Crady | Dec. 8, 1936 |